United States Patent [19]
Prischak et al.

[11] Patent Number: 4,586,886
[45] Date of Patent: May 6, 1986

[54] INSERT TRANSFER DEVICE AND METHOD

[75] Inventors: Joseph J. Prischak, Erie; William J. Vitron, Fairview; Carl E. Seaberg, Erie, all of Pa.

[73] Assignee: Plastek Industries, Inc., Erie, Pa.

[21] Appl. No.: 718,351

[22] Filed: Apr. 18, 1985

[51] Int. Cl.$^4$ .............................. B29C 6/00; B29F 1/00
[52] U.S. Cl. .................................. 425/123; 425/189; 425/190; 425/318
[58] Field of Search ............... 425/123, 124, 189, 190, 425/318

[56] References Cited

U.S. PATENT DOCUMENTS

| | | | |
|---|---|---|---|
| 996,449 | 6/1911 | Bodenstein | 425/318 |
| 2,658,238 | 11/1953 | Rizzo | 425/123 X |
| 2,781,554 | 2/1957 | Robinson | 425/123 X |
| 3,192,567 | 7/1965 | Abernethy et al. | 425/123 |
| 3,381,930 | 5/1968 | Gruenstein | 425/123 X |

*Primary Examiner*—J. Howard Flint, Jr.

*Attorney, Agent, or Firm*—Dale R. Lovercheck; Charles L. Lovercheck; Wayne L. Lovercheck

[57] ABSTRACT

A device and a method for transferring inserts into a mold which has at least one insert receiving cavity. Included in the device are an insert positioner and an insert actuator. The insert positioner includes a transfer plate, which has a mold face with at least one insert transfer channel aperture which opens into an insert transfer cavity. Included in the insert actuator are an actuator plate, and a plate actuator. The actuator plate has at least one actuator pin extending therefrom. The actuator plate and the transfer plate are connected to so that each of the actuator pins is substantially axially aligned with the central axis of an insert transfer channel. For moving the inserts into the mold the plate actuator is adapted to move the acutator plate toward the transfer plate and thereby convey each actuator pin at least partially through each corresponding insert transfer channel. The device is adapted for operation by hand.

11 Claims, 5 Drawing Figures

INSERT TRANSFER DEVICE AND METHOD

BACKGROUND OF THE INVENTION

Van De Walker et al in U.S. Pat. No. 3,827,856 discloses a method and apparatus for mass-manufacturing elongated hollow plastic objects, such as covers for electronic thermometer probes, and ball point pens having inserts at the ends thereof. The inserts are automatically loaded, by vibrating them into pockets and then lifting them out of the pockets into suction tubes which pass through a horizontal transfer plate into nests in a vertical transfer plate. Vacuum is employed to maintain the inserts in the nests during movement of the vertical transfer plate to positions adjacent the distal ends of the hollow core pins through which air is sucked. The vacuum in the vertical transfer plate is then converted to pressure to cause the inserts to fly across the air gaps to the core pin ends, following which the inserts are maintained on such ends by suction. The mold is then closed to cause the inserts to engage spring-biased plungers, following which the plastic is injected.

Sample et al in U.S. Pat. No. 2,094,823 discloses a method and an apparatus for suspending an insert into a mold cavity by partial vacuum.

These methods and apparatus use a vacuum source and vacuum distribution lines, which increase their initial and maintenance costs and burden the operator and production schedules. There is a long standing need for an economical and efficient device to transfer inserts into the insert receiving cavities of a mold.

BRIEF DESCRIPTION OF THE INVENTION

The device of the invention resolves these problems of the prior art by providing an efficient device which is relatively simple to operate and requires very little maintenance.

The invention provides a device for transferring inserts into a mold which has at least one insert receiving cavity. Included in the device are an insert positioner and an insert actuator. The insert positioner includes a transfer plate, which has a mold face with at least one insert transfer channel aperture which opens into an insert transfer channel. Included in the insert actuator are an actuator plate, and a plate actuator. The actuator plate has at least one actuator pin extending therefrom. The actuator plate and the transfer plate are connected so that each of the actuator pins is substantially axially aligned with the central axis of an insert transfer channel. For moving the inserts into the mold the plate actuator is adapted to move the actuator plate toward the transfer plate and thereby convey each actuator pin at least partially through each corresponding insert transfer channel. The device is adapted for operation by hand.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DETAILED DESCRIPTION OF THE INVENTION

Figure 1:
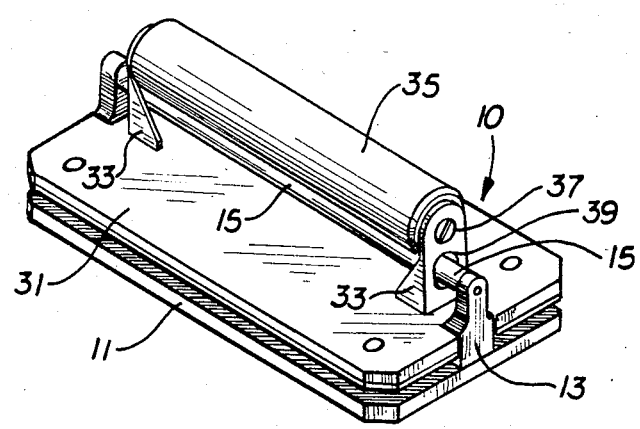
FIG. 1 is a perspective view of an insert transfer device in accordance with the present invention.
Figure 2:
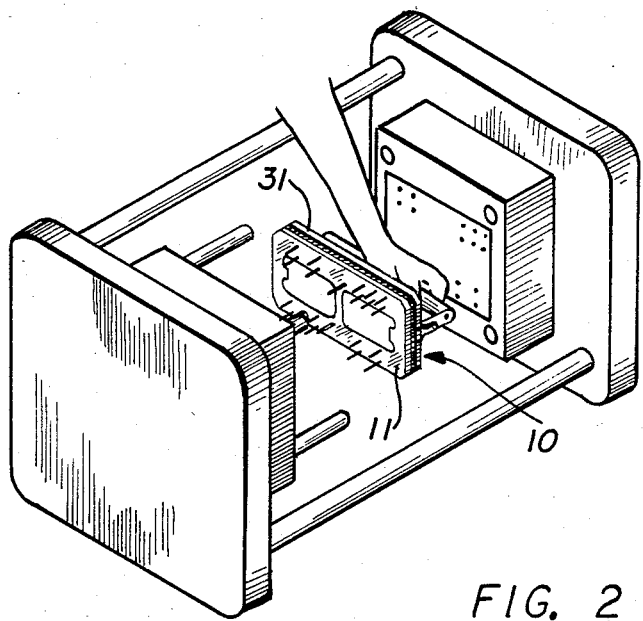
FIG. 2 is a view of an insert transfer device shown with inserts loaded and in position to be inserted in the mold.

With more particular reference to the Figures, the same identifying numeral refers to the same item in each of the figures. FIG. 1 shows an insert transfer device 10 in accordance with the invention. Inserts to be transferred into a mold are supported by the transfer plate 11. Transfer plate 11 is connected by transfer plate bracket 13 to bar 15. Transfer plate bracket 13 is bolted to bar 15 by bolt 17. The actuator plate return spring 19 is supported between transfer plate spring face 21 and actuator plate spring face 23.

Actuator plate 31 is connected by actuator plate bracket 33 to handle 35. Actuator plate bracket 33 is attached to handle 35 by screw 37. Bar 15 passes through eliptical aperture 39 of actuator plate bracket 33. Locating pins 41 and 42 extend perpendicularly from the transfer plate mold face 43 of the transfer plate 11.

Figure 4:
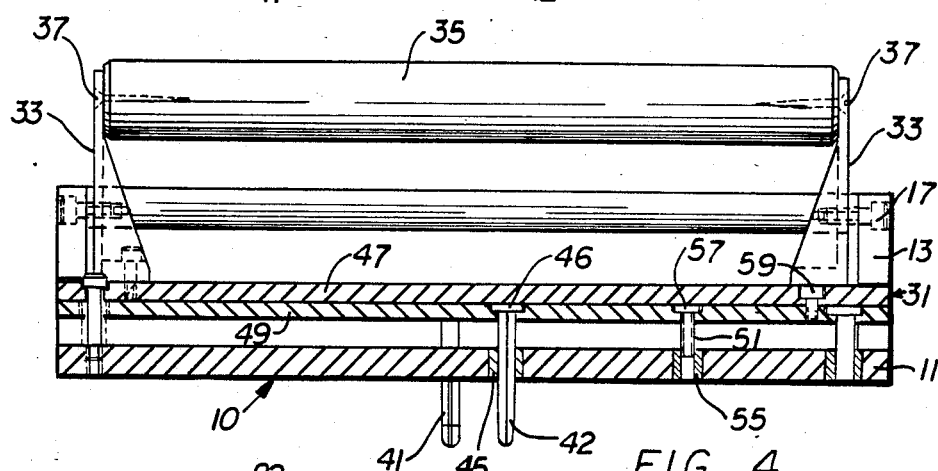
FIG. 4 is a partial cross-sectional side view of an insert transfer device in accordance with the present invention; and, FIG. 5 is a bottom view of an insert transfer device in accordance with the present invention.

With more particular reference to FIG. 4, it is seen that the locating pin 42 is supported about midway along its shaft by the locating pin guide channel wall 45 as it passes through transfer plate 11. Locating pin base 46 is supported between actuator plate cover 47 and actuator plate base 49.

Actuator pin 51 is supported at its head. Actuator pin guide channel wall 55 extends through transfer plate 11. Actuator pin base 57 is supported between actuator plate cover 47 and actuator plate base 49.

Actuator plate cover 47 is held to actuator plate base 49 by actuator cover-base bolt 59. Actuator plate bracket 33 is connected to actuator plate base 49 by actuator base-bracket bolt 61.

Figure 5:
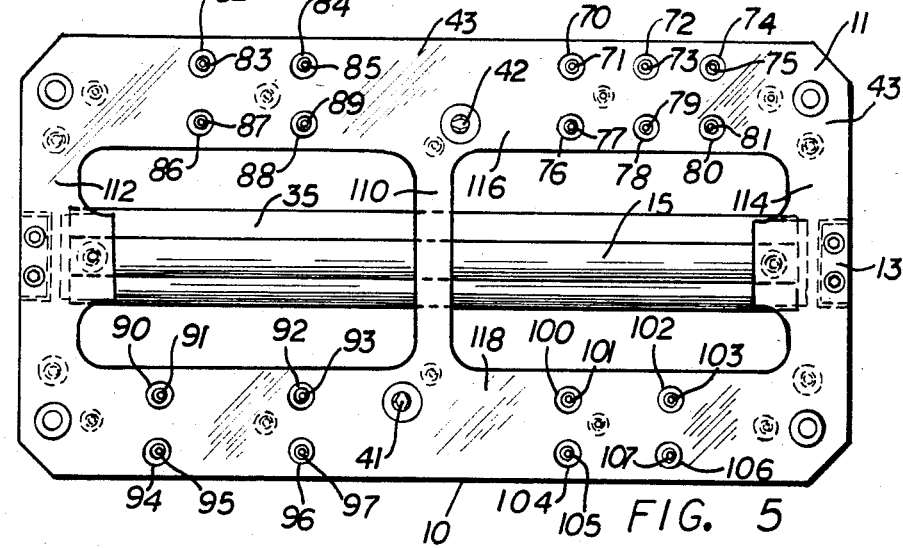

FIG. 5 shows transfer plate mold face 43 with a first group of insert support apertures 70, 72, 74, 76, 78 and 80 and actuator pin heads 71, 73, 75, 77, 79 and 81 therewithin. Insert support apertures 82, 84, 86 and 88 are a second group with actuator pin heads 83, 85, 87 and 89 respectively therewithin. A third group of insert support apertures 90, 92, 94 and 96 encloses actuator pin heads 91, 93, 95 and 97. Insert support apertures 100, 102, 104 and 106 are a fourth group with actuator pin heads 101, 103, 105 and 107 therewithin. Transfer plate center transverse support 110 and transfer plate end transverse supports 112 and 114 join the sides 116 and 118 of the transfer plate.

OPERATION

The insert transfer device is hand operated. Placing the inserts into the insert transfer device may be done by hand or by machine. During this loading of the inserts into the insert transfer device the transfer plate is preferably substantially horizontal with its mold face 43 up.

When in position to transfer inserts into the insert receiving mod cavities of a mold, the transfer plate mold face is usually substantially vertical.

To transfer inserts into a mold using the first group of insert actuator pins of the insert ransfer device the inserts are conveyed through the insert apertures 70, 72, 74, 76, 78, and 80 into the actuator pin guide channels in front of actuator pin heads 71, 73, 75, 77, 79 and 81. The inserts are supported in the actuator pin guide channels.

The operator positions the insert transfer device with the locating pins at the apertures of the mold which receive them. Locating pins 41 and 42 have rounded ends which tend to make them self-centering. This makes it easier for the operator to move the locating pins into the mold. The central axes of the locating pins are parallel to the central axes of the actuator in guide channels. As the locating pins are centered in the locating pin receiving cavities of the mold, the central axes of the actuator pin guide channels align with the central axes of the insert receiving cavities of the mold. The locating pins are then moved into the locating pin receiving cavities of the mold until the transfer plate with its insert apertures 70-80 are in position for transferring the inserts into the mold.

Transfer of the inserts is readily carried out using the insert transfer device 10. The operator pushes with the palm of his hand on the push handle 35 while pulling with his fingers on bar 15 thereby moving the actuator plate 31 toward the transfer plate. As the actuator plate moves it carries the actuator pins. Each of the actuator pin heads is moved through an actuator pin guide channel. Each actuator pin head pushes an insert as the pin head moves through an actuator pin guide channel. The inserts are forced by actuator pin heads out of the actuator pin guide channels into the insert receiving cavities of the mold. The travel of the actuator plate and actuator pins is stopped when the flange of the travel limit pin contacts the transfer plate. During the travel of the actuator plate the spring is compressed. When the operator stops pushing on the push bar it allows the spring to expand, pushing the actuator plate and the transfer plate apart to the distance of separation at the time of loading.

Figure 3:
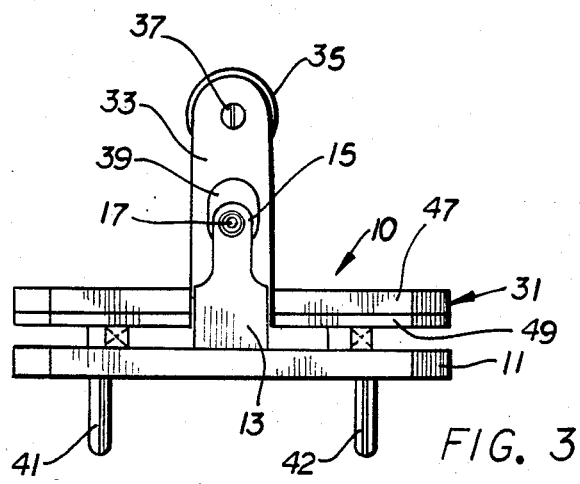
FIG. 3 is an end view of an insert transfer device in accordance with the present invention.

The insert transfer device 10 is adapted to transfer inserts into a four part making mold. Each of the four groups of actuator pin heads are used to transfer inserts into a separate part making portion of the mold. When the mold is filled with plastic the inserts become connected to one of the four parts molded. As shown in FIG. 3, the first group of insert apertures has six apertures, while each of the second, third and fourth groups have four insert apertures. Thus, one filling of the mold will produce one molded part with six inserts and three additional molded parts each having four inserts. In the embodiment of the invention shown in FIG. 3 different insert spacing is used in the groups. This is seen by comparing the difference in the distance between apertures 86 and 88 in the second group and the distance between apertures 90 and 92 in the third group.

For parts requiring more or fewer inserts per molded part or a different arrangement of inserts than the embodiment of the invention shown in the Figures the appropriate number and arrangement of insert apertures and corresponding actuator pins may be readily added or deleted in a modified embodiment in accordance with the invention.

In accordance with the invention of transferring inserts into insert receiving cavities of a mold, the operator is supplied with a device for transferring inserts into a mold having at least one insert receiving cavity. The device has an insert positioning portion and an insert actuator portion. The insert positioning portion includes a transfer plate member which has a mold face with at least one insert transfer channel aperture which opens into an insert transfer channel. The insert actuator portion includes an actuator plate member, and a plate actuator. The actuator plate member has at least one actuator pin extending therefrom. The actuator plate and the transfer plate are connected so that each actuator pin is substantially axially aligned with the central axis of an insert transfer channel.

The plate actuator is adapted to move the actuator plate toward the transfer plate and thereby convey each actuator pin at least partially through each corresponding insert transfer channel.

The operator then positions an insert into each insert transfer cavity. Then by inserting the locating pins of the insert transfer device into the locating pin receiving cavity of the mold, the operator aligns the central axis of each insert transfer channel with a corresponding central axis of an insert receiving cavity of the mold. The operator then pushes the handle which forces the actuator pins through the insert transfer channels. Alternatively, the operator pulls the bar with his fingers while pushing the handle with the palm of his hand. This forces the actuator plate and the transfer plate closer moving the actuator pins at least partially through the actuator pin guide channels enclosed by guide channel walls 55. Each actuator pin thus forces an insert into an insert receiving cavity of the mold.

When the inserts have been transferred into the insert receiving cavities of the mold, the operator releases the force of his push on the handle. The actuator plate return springs 19 having been compressed by the force of the operators push on the handle now expands moving the actuator plate away from the transfer plate. The travel of the actuator plate away from the transfer plate ends when the bar 15 engages the wall of the eliptical aperture of the actuator plate bracket.

The operator then pulls on the handle which removes the locating pins from the locating pin receiving cavities of the mold. Alternatively, the operator pulls the bar with his fingers while holding or pushing the handle with the palm of his hand. This removes the locating pins from the locating pin receiving cavities of the mold. The operator then releases the bar allowing the spring to expand moving the transfer plate and actuator plates away from each other.

The insert transfer device is then ready to be filled with the next group of inserts. The mold is then closed, injected with plastic, such as thermoplastic, and opened to produce four parts each having inserts embedded therein.

A spring is supported between the transfer plate member and the actuator plate member. The actuating includes the force against the actuator plate delivered through the actuator plate bracket by the operator's push on the handle. This forces the actuator plate and transfer plate to compress the spring as the actuator plate is moved toward the transfer plate. After the inserts have been inserted into the insert receiving cavities of the mold the operator reduces the pushing force against the handle 35 and the pulling force on the bar. This reduces the force against the spring allowing it to expand moving the actuator plate away from transfer plate.

While the present invention has been disclosed in connection with the preferred embodiment thereof, it should be understood that there may be other embodiments which fall within the spirit and scope of the invention as defined by the following claims.

The embodiments of the invention in which an exclusive property or privilege is claimed are defined as follows:

1. In combination, a device for transferring inserts into a mold and a mold having at least one insert receiving cavity, comprising:
    a transfer plate having a mold face with at least one insert transfer channel aperture in it which opens into said insert receiving cavity in said mold,
    an insert actuator means comprising an actuator plate, and a plate actuator means attached to said actuator plate,
    said actuator plate having at least one actuator pin extending therefrom,
    said actuator plate and said transfer plate being connected together so that each said actuator pin is substantially axially aligned with the central axis of each said insert transfer channel aperture,
    said plate actuator means being adapted to move said actuator plate toward said transfer plate and thereby convey each said actuator pin at least partially through each corresponding said insert transfer channel aperture, whereby inserts received in said insert transfer channel apertures are moved from said insert transfer channel apertures into insert receiving cavities in said mold.

2. The device of claim 1 wherein said insert actuator means further comprises mold alignment means for positioning the axis of each said insert positioning means coaxially with the corresponding axis of each said mold insert receiving cavity.

3. The device of claim 1 wherein said insert actuator means further comprises a bar and a transfer plate bracket,
    said transfer plate bracket connecting said transfer plate and said bar.

4. The device of claim 3 wherein said insert actuator means further comprises a handle and an actuator plate bracket,
    said actuator plate bracket connecting said actuator plate to said handle.

5. The device of claim 1 further comprising a spring,
    said spring being supported between said transfer plate and said actuator plate.

6. The device of claim 2 wherein said mold alignment means comprises at least one locating pin.

7. The device of claim 6 wherein said locating pin is supported by said actuator plate.

8. In combination a mold and an insert transfer device for transferring inserts into insert receiving cavities in said mold comprising:
    a transfer plate,
    an actuator plate having moving means supporting said actuator plate on said transfer plate and for moving said actuator plate towards said transfer plate,
    said moving means comprising actuator brackets fixed to said adapter plate,
    transfer brackets fixed to said transfer plate, a handle connected to said adapter brackets and a bar attached to said transfer brackets and extending in spaced parallel relation to said handle,
    locater pins supported on said actuator plate, holes in said transfer plate receiving said locater pins for guiding said transfer plate with respect to said actuator plate,
    said locater pins extending through said holes in said transfer plate and extending beyond said transfer plate and adapted to enter locating openings in said mold,
    spaced insert receiving holes in said transfer plate,
    said insert receiving holes being adapted to receive inserts to be pushed into said insert receiving cavities in said mold,
    actuator pins attached to said actuator plate,
    said transfer plate being adapted to engage said mold and said handle and said bar being adapted to be engaged by the hand of an operator and squeezed toward one another whereby said actuator pins enter said insert receiving holes and force said inserts from said holes into said insert receiving cavities in said mold.

9. The device of claim 8 wherein said means for moving said actuator plate and said transfer plate toward one another comprises said bar and said transfer bracket,
    said transfer brackets being connected to said transfer plate and said bar being connected to said actuator plate.

10. The device of claim 8 further comprising a spring,
    said spring being supported between said transfer plate and said actuator plate.

11. In combination a mold having openings and a transfer device for inserting inserts into said mold,
    said transfer device comprising an actuator plate on said device and a transfer plate,
    actuating brackets attached to said actuator plate,
    transfer brackets fixed to said transfer plate,
    a handle fixed to said actuator brackets,
    a bar fixed to said transfer brackets,
    said actuator plate being disposed in a plane parallel to said transfer plate,
    said transfer plate having openings therein,
    guide pins attached to said actuator plate and received in said transfer plate openings in said transfer plate,
    said guide pins being slidably received in said transfer plate openings of said transfer plate, extending through said transfer plate openings and adapted to be received in said openings in said mold,
    channels in said transfer plate adapted to receive inserts to be inserted into said mold,
    actuator pins supported on said actuator plate and adapted to enter said channels,
    said transfer plate being adapted to be moved into engagement with said mold,
    said bar and said handle being adapted to be grasped by a hand of an operator and squeezed whereby said inserts are forced from said transfer plate openings into said openings in said mold.

* * * * *